March 9, 1965 W. J. JAKUBAS 3,173,133

MAGNETIC MEMORY UNIT

Filed May 23, 1962 2 Sheets-Sheet 1

INVENTOR.
WLADYSLAW J. JAKUBAS

BY

C. A. Gullbrandsen

ATTY.

MAGNETIC MEMORY UNIT

Filed May 23, 1962 2 Sheets-Sheet 2

ENERGIZE 120

AUTO STEP 130

INVENTOR.
WLADYSLAW J. JAKUBAS
BY
C. A. [signature]
ATTY.

3,173,133
Patented Mar. 9, 1965

3,173,133

MAGNETIC MEMORY UNIT

Wladyslaw J. Jakubas, Chicago, Ill., assignor to Automatic Electric Laboratories, Inc., Northlake, Ill., a corporation of Delaware Filed May 23, 1962, Ser. No. 197,014
20 Claims. (Cl. 340—174)

This invention relates to magnetic memory units and particularly to memory units using multi-aperture magnetic cores for the storage of information on a non-destructive basis.

It is the object of this invention to provide a memory unit that combines the storage characteristics of the multi-aperture ferrite cores with a high degree of reliability provided by an electromechanical stepping switch as a means for accessing the cores.

A first feature of this invention is the provision of memory circuitry that can be easily accessed and read out without destroying the information encoded therein.

Another feature of the invention is to provide magnetic memory circuitry that is both low in cost and high in reliability.

Yet another feature of this invention is the provision of control circuitry for a magnetic core memory that facilitates rapid programming or correction of the memory unit.

Applicant's invention is a non-destructive memory system that provides simple read and read out, ease of programming and utilizes low cost components. Such a device is capable of storing binary information for indefinite periods of time and yet may be re-programmed easily at any time.

Uses of a memory of this type will be obvious in the areas of machinery control, where machine function could be controlled by the memory for indefinite periods of operation. If an operation or a sequence of operations of a machine would require changing, re-programming would be extremely simple.

Other uses as a buffer storage unit, inventory control device, etc. are also possible. Many applications requiring a medium speed low cost memory device could employ applicant's system disclosed herein.

To achieve the desired results stemming from a low cost non-destructive memory device, applicant has combined the storage characteristics of the multi-aperture ferrite core with the high degree of reliability provided by an electromechanical stepping switch as a means for accessing the cores. Construction of units utilizing this combination provide a high degree of reliability not usually found in memory devices employing high cost static state circuitry.

The features of this invention as well as the invention itself both as to its organization and method of operation will best be understood from the following description which when read in connection with the accompanying drawing wherein.

Figure 1:
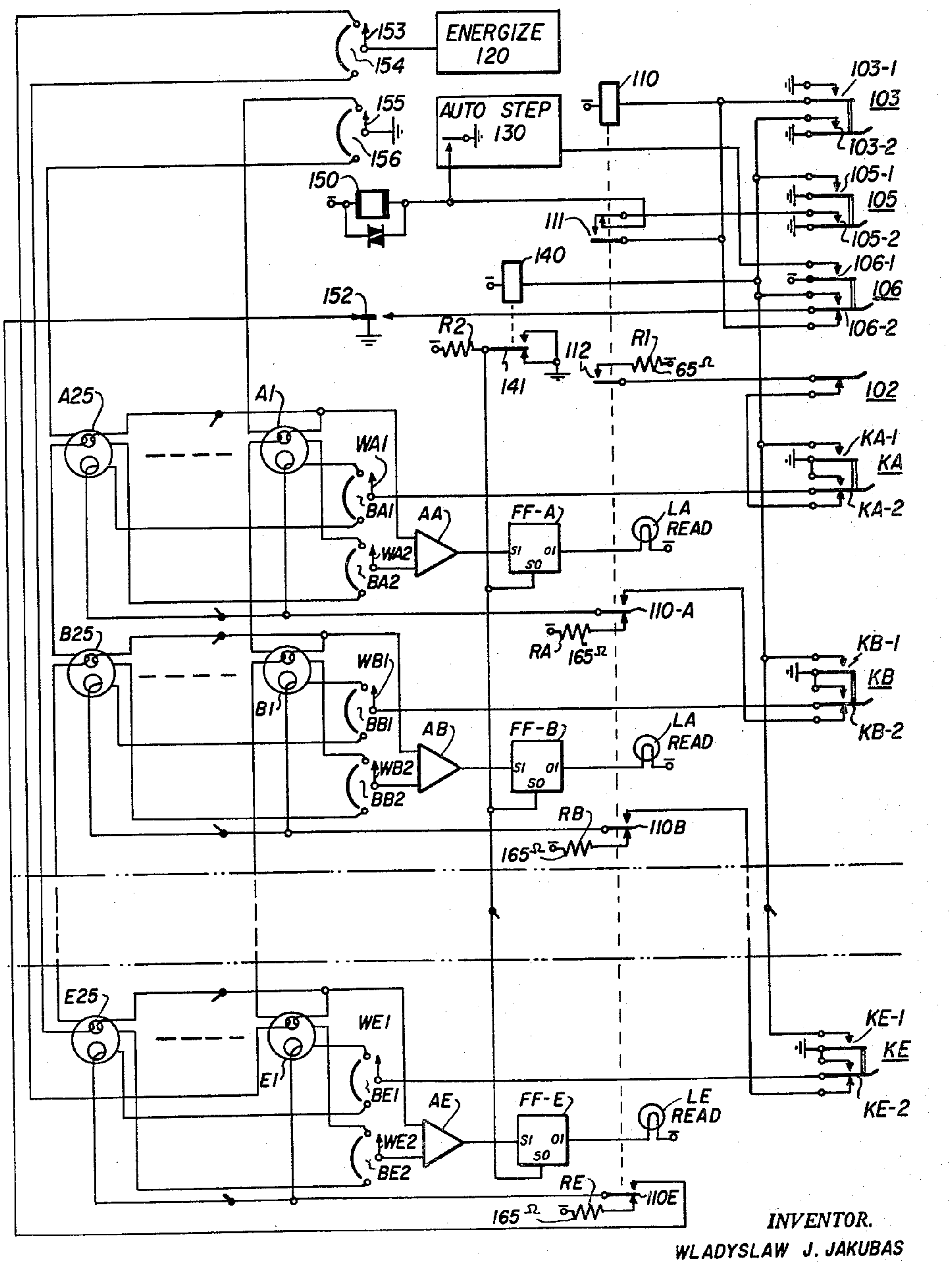
FIG. 1 is a schematic diagram of a magnetic memory unit according to the invention.

The memory unit as shown in FIG. 1 contains 125 multi-aperture ferrite cores. The cores are arranged on five levels designated as levels A, B, C, D and E, each level having 25 cores (in positions 1 to 25 inclusive). In this arrangement 25 numbers may be stored in the memory unit on a biquinary basis or 25 five bit code words could be stored. Obviously additional cores could be added or subtracted as well as increasing or decreasing the number of positions or levels.

An electromechanical stepping switch 150 provides access to all levels of the memory unit, simultaneously accessing one core on each level and sequentially accessing all of the cores on all levels. In other words five cores are accessed at any one time. Thus a single code digit or word is read for each step for advance of the stepping switch.

Control of the memory unit is provided by a group of keys whose function is as follows:

*Write keys.*—Five write keys (KA, KB, KC, KD and KE) are provided, one for each level. Operation of any write key will set the magnetic cores on the associated level, and in the position then accessed by the stepping switch, to a write or set "1" condition.

*Auto-step key.*—Operation of the auto-step key 106 causes the stepping switch to operate continuously providing a sequential read out of all the cores of the memory with a continual repeat.

*Manual step key.*—Operation of the manual step key 105 advances the stepping switch one position only for each key operation. At the same time operation of the manual step key normally sets all the magnetic cores in the next position to be accessed, to a set "0" or erase condition.

*Review key.*—Operation of the review key 102 is associated with the manual step key. When the review key is operated, cores in the next position to be accessed by the stepping switch will not be set to the erase condition, and a normal read out indication will be given as when the auto-step key 104 is operated.

*Erase key.*—If an error is made in operation of the write keys the erase key 103 is operated to set all the cores in the particular position being accessed at that moment to the erase or set "0" condition. After this the write keys may be reoperated to set the cores then being accessed in the proper manner.

For a clearer understanding of the technique for writing into the cores of the memory reference is made to FIG. 1. In the starting condition it is assumed that the stepping switch 150 is in the first position thus placing wipers WA1, WA2, WB1, WB2, etc. on the first bank contacts of their associated levels A, B, etc. To write into core A1 on level A write key KA is depressed. Operation of key KA completes a circuit, extending from battery through 165 ohm resistance RA, contact 110A, the lower aperture of magnetic core A1, through the first bank contact on level BA1 of rotary switch 150, wiper WA1 and make contact KA2 of key KA to ground. Core A1 is now set to the "write" or "set 1" condition. The pulse of battery transmitted through core A1 was effective to set the core to this condition because of the cores square hysteresis loop characteristics.

To place cores B1 through E1 in the same condition write keys KB through KE are operated in a manner similar to that above for the operation of each key completing a connection for sending a current pulse to the core on the associated level placing the selected core in the write or set 1 condition.

To write into cores A2, B2, etc. or any of the additional cores in the memory unit, manual step key 105 is depressed extending ground through make spring 105–2 and relay contacts 111 to energize motor magnet 150 of the stepping switch. Ground through interrupter springs 152 of motor magnet 150 is extended through break contact 106–2 of auto-step key 106 to relay 110 causing it to operate. Locking ground, extended via make contact 105–2 of previously operated manual step key 105 and make contact 111 provides a holding circuit for relay 110. At the same time operation of relay 110 removes the ground extending to motor magnet 150 at break after make contacts 111 allowing stepping switch 150 to advance. Battery through 65 ohm resistance R1 now extends to contacts 112, review key 102, break contact KA2, write key KA, wiper WA1 to bank contact 2 on level BA1 through the lower aperture of core A2 to make contact 110A, contacts KB2 on write key KB, bank wiper WB1, second bank contact on level BB1 of selector switch 150, through the lower aperture of core B2, to make contact 110B and through similar paths through write keys KC and KD not shown and the relay contacts, bank contacts, bank wipers and cores of levels C and D not shown to the break contact KE2 of write key KE, from thence over wiper WE1, the second bank contact on bank level BE1, through the lower aperture of core E2 (not shown) through make contact 110E, and thence to ground through interrupter contact 152. As indicated above battery through resistance R1 has been extended through selected cores in this case cores A2, B2, etc. on each level. This current pulse flows in the opposite direction to that of the write or set 1 pulse and constitutes an erase or set 0 pulse, thus all the cores then being accessed, on each level, are set to their 0 state if they were not in this state at the present time. If the cores were already in the set 0 state they remain in that condition. The amplitude of current pulse was determined by the 65 ohm resistance R1.

The cores A2 through E2 may now be written into in a manner previously described, after which cores A3 through E3 may be accessed and placed in their set 0 condition by another operation of manual step key 105. Subsequently all the remaining cores in the memory unit may be first placed in their erase or set 0 condition and then written into as desired by operation of the appropriate write keys following operation of the manual step key 105.

Figure 4:
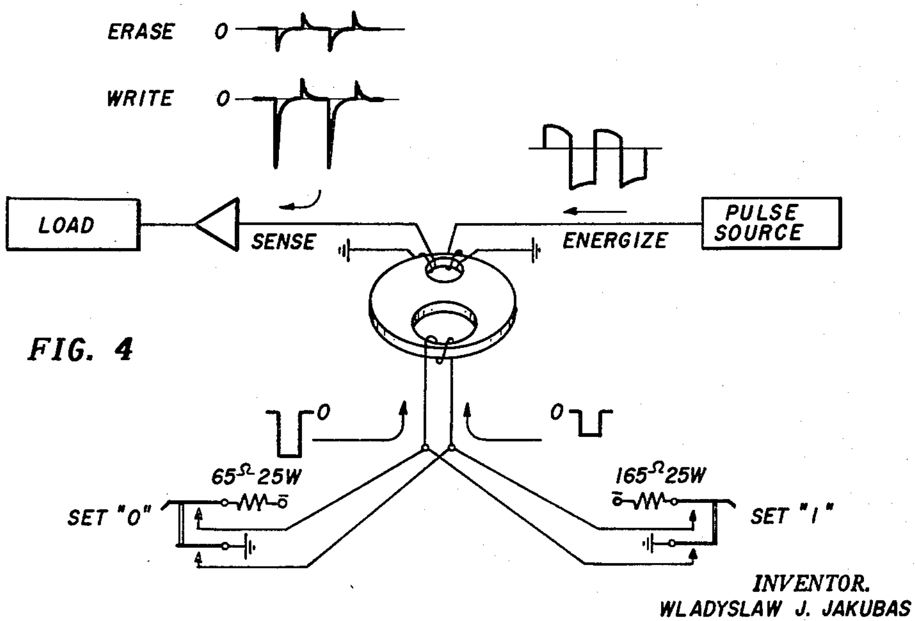
FIG. 4 is a simplified diagram disclosing the control circuitry used in energizing, writing, erasing and reading any of the magnetic cores of the present invention. The shapes of the control pulses are shown in this diagram.

It should be noted that both the write or set 1 condition and the erase or set 0 condition imposed upon the cores of the memory unit were achieved by application of the appropriate polarity and magnitude of pulses over the same winding extending through the lower apertures of the cores (as shown in FIG. 4).

If a mistake is made in writing the information into any of the cores of the memory it may be desirable to correct that mistake. Assume now stepping switch 105 and its wipers WA1, WA2, WB1, WB2 in their first position on the associated bank contacts, and it was desired to set cores A1, A3 and A5 to the set 1 or write condition. In error, however write keys for the setting of cores A2, A3 and A5 were operated.

In order to make a correction erase key 103 is operated to extend ground to contacts 103–1 to relay 110. Relay 110 operates placing battery through resistance R1 and contacts 111 to review key 102 and write key KA, over wiper WA1, the first contact on level BA1, through the lower aperture of core A1, through contact 110A, write key contact KB2, wiper WB1, the first bank contact on level BB1, through core B1, contact 110B, to levels C and D in similar chain fashion through write key KE, contacts KE2, wiper WE1, the first contact on level B1, the lower aperture of core E1, contact 110E, to interrupter contacts 152 and thence to ground. As previously noted this pulse received from the battery through the 65 ohm resistance blocks the cores then connected (cores A1, B1, etc.) placing them in their erased or set 0 condition.

New information may now be written into the selected cores by depressing the proper write keys KA, KC and KE and properly place cores A1, C1 and E1 in their write or set 1 condition. It should be noted that only five cores were set to the erase condition and not the entire memory, eliminating the need to rewrite information into the memory in its entirety after the correction switch is used. It should be further noted that no advance of the rotary switch was made at this time as takes place during the normal programming of the memory when the manual step switch is operated.

Information stored in the cores of the memory is read by examination of the state of the cores. Upon discovery of the core set to the set 1 or read state detection of this state and amplification of this detected signal is made for use in connection with operation of a load circuit comprising some sort of read out device.

In the instant invention the amplified detected signal is applied to a conventional flip-flop circuit (FFA to FEE) to turn on a lamp (LA–LE) as a visual indication of information stored in the cores. It is of course to be understood that rather than the visual indication provided by the lamp the stored information might be utilized in many other ways for registering the information or for operation of other devices or applications wherein the memory may be used.

Read out takes place in the following manner. Asymmetrical waveforms are transmitted from energize circuit 120 shown in detail in FIG. 2 via path extending over wiper 153, the first contact on bank 154, to the upper aperture of cores A1, B1, C1, D1 and E1 to the first bank contacts on separate switch level 156 over wiper 155 to ground. Obviously as the stepping switch advances to the second bank contacts the energize winding will extend through cores A2, B2, etc. and so on until cores A25, B25, etc. are reached with the stepping switch in its last position. Transmittal of the energizing signal through the upper apertures of the selected cores induces a voltage in the sense windings permitting a read out without disturbing the state of the cores. The sensing circuits extend for example from amplifier AA through the upper aperture of core A1 to the first bank contact on level BA2, over wiper WA2, to amplifier AA. Similar paths exist for cores A2 through A25 as well as the cores of levels B through E inclusive. If a core is in the read or set 1 condition a considerable amount of voltage will be induced in the sense winding from the energize circuit previously outlined and then applied to amplifier AA. This signal is amplified by amplifier AA and applied to the load circuit consisting of flip-flop FFA and lamp LA. Application of the signal to flip-flop FFA which is conventional in nature would drive it to its first state causing an output to be extended to lamp LA. Lamp LA will light indicating the presence of a set 1 or read condition in core A1. If the core had been in the set 0 or erase condition considerably less voltage would be induced in the sense winding resulting in inadequate voltage being applied to flip-flop FFA by amplifier AA. Consequently flip-flop FFA would remain in its 0 condition. The lamp LA of course would not light under these conditions. Likewise the presence of write or set 1 signals in any of the cores will be noted by operation of the lamps on their associated levels.

Figure 3:
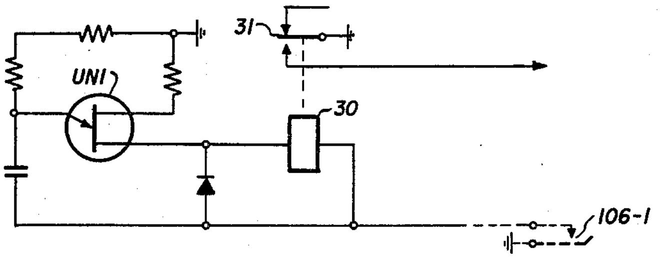
FIG. 3 is a schematic diagram of an automatic stepping circuit useful for advancing an electromagnetic stepping switch like that used in the present invention.

As in the case of setting the cores or erasing the cores of the memory unit read out occurs on the basis of five cores at a time reading each of the cores on each level sequentially with one core on each level being read simultaneously. During operation complete read out of the memory unit is effected by operation of auto-step key 106. Auto-step key 106 extends at its contacts 106–1 battery to auto-step unit 130 shown in detail in FIG. 3. Auto-step unit then applies ground periodically to motor magnet 150 of the stepping switch, causing the stepping switch to advance continuously in a self-interrupted manner giving simultaneous read outs of one core on each level, and all of the cores in the memory on a sequential basis.

During the read out operation relay 140 is operated with each advance of the stepping switch, by extension of ground through interrupter springs 152, and contacts 106–2 of auto step key 106 to relay 140. Each operation of relay 140 removes ground at contacts 141 entirely from flip-flops FFA through FFE causing them to change, their state to extinguish their associated lamps LA through LE respectively, thus preparing them for read out of the next group of cores. The subsequent operation of lamps occurs only after the stepping switch has advanced to read a new series of cores and incoming signals from the associated amplifiers will cause the flip-flop circuits to again change state. It should be noted that the usage of the information stored in the cores of the memory has been applied to lighting a visual indicator. It must be understood that this output signal may be utilized in many ways as set forth previously.

If a need should arise to examine the conditions of the cores in the memory as to their condition (write or erase) without need for erasing any of the information found in the cores, review key 102 is operated after which manual step key 105 may be operated in a manner previously outlined. A read out of information stored in the cores of the memory will now be indicated as outlined above in connection with the operation of auto-step key 106. However operation of review key 102 effectively disconnects battery through 65 ohm resistance R1 from application to the cores of the memory thus allowing them to retain information stored and not erasing the next series of cores as would be the case outlined in programming during which the manual step key 105 would be operated alone.

Figure 2:
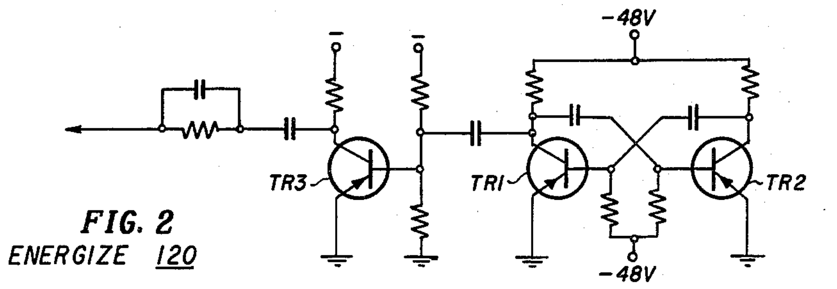
FIG. 2 is a schematic diagram of an energize or pulse circuit useful in a magnetic memory unit according to the instant invention.

The asymmetrical driver shown in FIG. 2 comprises a conventional free running multivibrator whose output is coupled to a single stage amplification circuit. Pulses from this circuit provide the necessary pulses for the energize windings of each of the cores which when the cores are in their read or set 1 condition will be coupled to their associated sense windings. The auto-step unit 130 shown in detail in FIG. 3 comprises a unijunction transistor oscillator and a relay. Application of battery to the auto-step circuit causes periodic pulses to be applied to relay 30 causing it to periodically apply ground at its contacts 31 for extension to motor magnet 150 of the memory unit.

What is claimed is:

1. A memory unit comprising: a plurality of multi-aperture magnetic cores each adapted to be set to a stable state and each including, a first and second aperture, a control winding extending through said first aperture, an energize winding and a sense winding each extending through said second aperture; a pulse source; a load circuit; a battery source; means operated to select one of said cores and connect said pulse source to said energize winding, said load circuit to said sense winding and said battery source to said control winding on said selected magnetic core, said selected core set to a stable state in response to connection to said battery source; said load circuit operated in response to a pulse from said pulse source coupled through said selected magnetic core when said core is in its stable state.

2. A memory unit comprising: a plurality of groups of multi-aperture magnetic cores, each core in each group adapted to be set to two stable states and each including a first and second aperture, a control winding extending through said first aperture, an energize winding and a sense winding each extending through said second aperture; a pulse source; a plurality of load circuits each associated with one of said groups of cores; a battery source; means operated to select one of said cores in each of said groups and to connect said pulse source to said energize windings on said selected one of said magnetic cores in each of said groups, each of said load circuits individually to said sense windings on said selected one of said magnetic cores in each of said associated groups, and said battery source to said control windings on said selected one of said magnetic cores in each of said groups; said selected cores set to a stable state in response to connection to said battery source, said load circuits operated in response to pulses from said pulse source coupled through said selected magnetic cores when said cores are in their stable state.

3. A memory unit comprising: a plurality of multi-aperture magnetic cores each adapted to be set to two stable states and each including a first and second aperture, a control winding extending through said first aperture, an energize winding and a sense winding each extending through said second aperture; a pulse source; a load circuit; a first and a second battery source; control means connected to said first and second battery sources; means operated to select one of said cores and to connect said pulse source to said energize winding, said load circuit to said sense winding and said control means to said control winding, on said selected one of said magnetic cores; said control means manually operated to connect said first battery source to said control winding to set said selected magnetic core to a first stable state; said load circuit operated in response to a pulse from said pulse source coupled through said selected magnetic core when said core is in its first stable state; said control means further manually operated to disconnect said first battery source and connect said second battery source to said control winding to set said selected magnetic core to a second stable state; said pulse from said pulse source blocked by said selected magnetic core when said core is in its second stable state.

4. A memory unit comprising: a plurality of groups of multi-aperture magnetic cores, each core in each group adapted to be set to two stable states and each including, a first and second aperture, a control winding extending through said first aperture, an energize winding and a sense winding each extending through said second aperture, a pulse source; a plurality of load circuits each associated with one of said groups of cores; a first battery source and a second battery source; first control means connected to said first and second battery sources; means operated to select one of said cores in each of said groups and to connect said pulse source to said energize winding on said selected one of said magnetic cores in each of said groups, each of said load circuits individually to said sense winding on said selected one of said magnetic cores in said associated group; and said control circuit to said control winding on said selected one of said magnetic cores in each of said groups; said control means manually operated to connect said first battery source through said control windings to set said selected magnetic cores in each of said groups to a first stable state; said load circuits operated in response to a pulse from said pulse source coupled through said selected magnetic cores when said cores are in their first stable state; said control means further manually operated to disconnect said first battery source and connect said second battery source to said control windings to set said selected magnetic cores to a second stable state; said pulses from said pulse source blocked by said selected magnetic core when said core is in its second stable state.

5. A memory unit comprising: a plurality of multi-aperture magnetic cores each adapted to be set to a stable state and each including a first and second aperture, a control winding extending through said first aperure, an energize winding and a sense winding each extending through said second aperture; a pulse source; a load circuit; a battery source; selecting means; manual advance means connected to said selecting means, manually operated to manually advance said selecting means to individually select in sequence each of said magnetic cores; said selecting means operated in response to advancement to connect said pulse source to said energize winding, said load circuit to said sense winding and said battery source to said control winding on said selected one of said magnetic cores.

6. A memory unit comprising: a plurality of groups of multi-aperture magnetic cores each core in each group adapted to be set to two stable states and each including a first and a second aperture, a control winding extending through said first aperture, an energize winding and a sense winding each extending through said second aperture, a pulse source; a plurality of load circuits each associated with one of said groups of cores; a battery source; selecting means; manual advance means connected to said selecting means manually operated to manually advance said selecting means to select in sequence one of each of said plurality of cores in each of said groups; said selecting means operated in response to advancement to connect said pulse source to said energize winding, said load circuit to said sense winding and said battery source to said control winding on said selected magnetic cores.

7. A memory unit comprising: a plurality of multi-aperture magnetic cores each adapted to be set to a stable state and each including a first and a second aperture, a control winding extending through said first aperture, an energize winding and a sense winding each extending through said second aperture; a pulse source; a load circuit; a battery source; selecting means; automatic advance means connected to said selecting means, manually operated to automatically advance said selecting means to individually select in sequence each of said magnetic cores; said selecting means operated in response to advancement to connect said pulse source to said energize winding, said load circuit to said sense winding, and said battery source to said control winding on said selected magnetic core.

8. A memory unit comprising: a plurality of groups of multi-aperture magnetic cores, each core in each group adapted to be set to a stable state and each including, a first and second aperture, a control winding extending through said first aperture, an energize winding and a sense winding each extending through said second aperture, a pulse source; a plurality of load circuits each associated with one of said groups of cores; a battery source; a connecting means; automatic advance means connected to said selecting means manually operated to automatically advance said selecting means to select in sequence one of each of said plurality of cores in each of said groups; said selecting means operated in response to advancement to connect said pulse source to said energize windings, said load circuits to said associated sense windings and said battery source to said control windings on said selected magnetic cores.

9. A memory unit comprising: a plurality of multi-aperture magnetic cores each adapted to be set to two stable states and each including a first and second aperture, a control winding extending through said first aperture, an energize winding and a sense winding each extending through said second aperture; a pulse source; a load circuit; a first and a second battery source; control means connected to said first and second battery source; selecting means; manual advance means connected to said selecting means, manually operated to manually advance said selecting means to individually select in sequence each of said magnetic cores; said selecting means operated in response to advancement to connect said pulse source to said energize winding, said load circuit to said sense winding and said control circuit to said control winding on said selected magnetic core; said control means manually operated to connect said first battery source to said control winding to set said selected magnetic core to its first stable state; said load circuit operated in response to a pulse from said pulse source coupled through said selected magnetic core when said core is in its first stable state; said control means further manually operated to disconnect said first battery source and connect said second battery source to said control winding to set said selected magnetic core to a second stable state; said pulse from said pulse source blocked by said selected magnetic core when said core is in its second stable state.

10. A memory unit comprising: a plurality of groups of multi-aperture magnetic cores each adapted to be set to two stable states and each including a first and second aperture, a control winding extending through said first aperture, an energize winding and a sense winding each extending through said second aperture; a pulse source; a plurality of load circuits each associated with one of said group of cores; a first and second battery source; selecting means; manual advance means connected to said selecting means, manually operated to manually advance said connecting means to select in sequence one of each of said plurality of cores in each of said groups; said selecting means operated in response to advancement to connect said pulse source to said energize windings; said load circuits and said associated sense windings and said control circuit to said control windings on said selected magnetic cores; said control means manually operated to connect said first battery source to said control windings to set said selected magnetic cores to their first stable state; said load circuits operated in response to pulses from said pulse source coupled through said selected magnetic cores when said cores are in their first stable state; said control means further manually operated to disconnect said first battery source and connect said second battery source to said control windings to set said selected magnetic cores to a second stable state; said pulses from said pulse source blocked by said selected magnetic cores when said cores are in their second stable state.

11. A memory unit comprising: a plurality of multi-aperture magnetic cores each adapted to be set to two stable states and each including a first and second aperture, a control winding extending through said first aperture, an energize winding and a sense winding each extending through said second aperture; a pulse source; a load circuit; a first and a second battery source; control means connected to said first and second battery sources; selecting means; automatic advance means connected to said selecting means, manually operated to automatically advance said selecting means to individually select in sequence each of said magnetic cores; said selecting means operated in response to said advancement to connect said pulse source to said energize winding, said load circuit to said sense winding and said control circuit to said control winding on said selected one of said magnetic cores; said control means manually operated to connect said first battery source to said control winding to set said selected magnetic core to a first stable state, said load circuit operated in response to a pulse from said pulse source coupled through said selected magnetic core when said core is in its first stable state; said control means further manually operated to disconnect said first battery source and connect said second battery source to said control winding to set said selected magnetic core to a second stable state; said pulse from said pulse source blocked by said selected magnetic core when said core is in its second stable state.

12. a memory unit comprising: a plurality of groups of multi-aperture magnetic cores, each core in each group adapted to be set to two stable states and each including a first and a second aperture, a control winding extending through said first aperture, an energize winding and a sense winding each extending through said second aperture; a pulse source, a plurality of a load circuits each associated with one of said groups of cores; a first and a second battery source; control means connected to said first and second battery source; selecting means; automatic advance means connected to said selecting means, manually operated to automatically advance said selecting means to select in sequence one of each of said plurality of cores in each of said groups; said selecting means operated in response to said advancement to connect said pulse source to said energize windings, said load circuits to said sense windings and said control circuits to said control windings of said selected magnetic cores; said control means manually operated to connect said first battery source to said control windings to set said selected magnetic cores to a first stable state, said load circuits operated in response to pulses from said pulse source coupled through said selected magnetic cores when said cores are in their first stable state; said control means further manually operated to disconnect said first battery source and connect said second battery source to said control windings to set said selected magnetic cores to a second stable state; said pulses from said pulse source blocked by said selected magnetic cores when said cores are in their second stable state.

13. A memory unit comprising: a plurality of multi-aperture magnetic cores each adapted to be set to two stable states and each including a first and second aperture, a control winding extending through said first aperture, an energize winding and a sense winding, each extending through said second aperture; a pulse source; a load circuit; a first and a second battery source; control means connected to said first and second battery sources; selecting means; manual advance means connected to said selecting means manually operated to manually advance said selecting means to individually select in sequence each of said magnetic cores; and automatic advance means connected to said selecting means manually operated to automatically advance said selecting means to individually select in sequence each of said magnetic cores; said selecting means operated in response to advancement to connect, said pulse source to said energize winding, said load circuit to said sense winding and said control circuit to said control winding, on said selected magnetic core; said control means manually operated to connect said first battery source to said control winding to set said selected magnetic core to a first stable state; said load circuit operated in response to a pulse from said pulse source coupled through said selected magnetic core when said core is in its first stable state; said control means further manually operated to disconnect said first battery source and connect said second battery source to said control winding to set said selected magnetic core to a second stable state; said pulse from said pulse source blocked by said selected magnetic core when said core is in its second stable state.

14. A memory unit comprising a plurality of groups of multi-aperture magnetic cores, each adapted to be set to two stable states and each including a first and second aperture, a control winding extending through said first aperture, an energize winding and a sense winding, each extending through said second aperture; a pulse source; a plurality of load circuits each associated with one of said groups; a first and a second battery source; control means connected to said first and said second battery sources; selecting means; manual advance means connected to said selecting means manually operated to manually advance said selecting means to select in sequence one of each of said plurality of cores in each of said groups; and automatic advance means connected to said selecting means manually operated to automatically advance said selecting means to select in sequence one of each of said plurality of cores in each of said groups; said selecting means operated in response to said advancement to connect said pulse source to said energize winding, said load circuit to said sense winding and said control circuits to said control windings of said selected magnetic cores; said control means manually operated to connect said first battery source to said control windings to set said selected magnetic cores to a first stable state, said load circuits operated in response to pulses from said pulse source coupled through said selected magnetic cores when said cores are in their first stable state; said control means further manually operated to disconnect said first battery source and connect said second battery source to said control windings to set said selected magnetic cores to a second stable state; said pulses from said pulse source blocked by said selected magnetic cores when said cores are in their second stable state.

15. A memory unit comprising: a plurality of multi-aperture magnetic cores each adapted to be set to two stable states and each including a first and second aperture, a control winding extending through said first aperture, an energize winding and a sense winding each extending through said second aperture; a pulse source comprising a free running multivibrator; a load circuit; a first and a second battery source; control means comprising a first key connected to said first battery source, a second key connected to said second battery source and a relay; selecting means comprising an electromechanical stepping switch operated to complete circuit connections from said multivibrator to said energize winding, from said load circuit to said sense winding and from said control means to said control winding on a selected one of said magnetic cores, said first key manually operated to connect said first battery source to said control winding to set said selected magnetic core to a first stable state; said load circuit operated in response to a pulse from said multivibrator coupled through said selected magnetic core when said core is in its first stable state; said second key manually operated to operate said relay to disconnect said first battery source and connect said second battery source to said control winding to set said selected magnetic core to a second stable state; said pulse from said multivibrator blocked by said selected magnetic core when said core is in its second stable state.

16. A memory unit comprising: a plurality of groups of multi-aperture magnetic cores each core in each group adapted to be set to two stable states and each including a first and a second aperture, a control winding extending through said first aperture, an energize winding and a sense winding each extending through said second aperture; a pulse source comprising a free running multivibrator; a plurality of load circuits each associated with one of said groups of cores; a first and a second battery source; control means comprising a plurality of keys each connected to said first battery source; a second key connected to said second battery source and a relay; selecting means comprising an electromechanical stepping switch operated to complete circuit connections from said multivibrator to said energize windings, from said load circuits to said sense windings and from said control means to said control windings on a selected one of said magnetic cores in each of said groups, said first keys each manually operated to connect said first battery source to said control winding to set said selected magnetic core in said associated group to a first stable state; said load circuits operated in response to pulses from said pulse source coupled through said selected magnetic cores when said cores are in their first stable state, said second key manually operated to operate said relay to disconnect said first battery source to connect said second battery source through said control windings to get said selected magnetic cores to a second stable state; said pulses from said multivibrator blocked by said selected magnetic cores when said cores are in their second stable state.

17. A memory unit comprising: a plurality of multi-aperture magnetic cores each adapted to be set to two stable states and each including a first and second aperture, a control winding extending through said first aperture, an energize winding and a sense winding each extending through said second aperture; a pulse source comprising a a free running multivibrator; a load circuit; a battery source; selecting means; comprising an electromagnetic stepping switch; a manual advance key connected to said selecting means, manually operated to manually advance said stepping switch to individually select in sequence each of said magnetic cores; and an automatic advance key connected to said stepping switch, manually operated to automatically advance said stepping switch to individually select in sequence each of said magnetic cores; said stepping switch operated in response to advancement to connect, said multivibrator to said energize winding, said load circuit to said sense winding and said control circuit to said battery source on said selected magnetic core.

18. A memory unit comprising: a plurality of groups of multi-aperture magnetic cores, each core in each group adapted to be set to two stable states and each including a first and second aperture, a control winding extending through said first aperture, an energize winding and a sense winding each extending through said second aperture; a pulse source comprising a free running multivibrator; a plurality of load circuits each associated with one of said groups of cores; a battery source; selecting means comprising an electromagnetic stepping switch; a manual advance key connected to said selecting means, manually operated to manually advance said stepping switch to select in sequence one of each of said plurality of cores in each of said groups; and an automatic advance key connected to said stepping switch manually operated to automatically advance said stepping switch to select in sequence one of each of said plurality of cores in each of said groups; said stepping switch operated in response to advancement to connect said multivibrator to said energize windings, said load circuits to said associated sense windings and said control circuit to said battery source on each of said selected magnetic cores.

19. A memory unit comprising: a plurality of multi-aperture magnetic cores each adapted to be set to two stable states and each including a first and second aperture, a control winding extending through said first aperture, an energize winding and a sense winding each extending through said second aperture; a pulse source comprising a free running multivibrator; a load circuit; a first and a second battery source; control means comprising a first key connected to said first battery source, a second key connected to said second battery source and a relay connected to said second key; selecting means comprising an electro-mechanical stepping switch; a manual advance key connected to said stepping switch, manually operated to manually advance said stepping switch to individually select in sequence each of said magnetic cores; an automatic advance key connected to said stepping switch, manually operated to automatically advance said stepping switch to individually select in sequence each of said magnetic cores; said stepping switch operated in response to advancement to connect said multivibrator to said energize winding, said load circuit to said sense winding and said control circuit to said control winding, on said selected magnetic core; said first key manually operated to connect said first battery source to said control winding to set said selected magnetic core to a first stable state; said load circuit operated in response to a pulse from said multivibrator coupled through said selected magnetic core when said core is in its first stable state; said second key manually operated to operate said relay to disconnect said first battery source and connect said second battery source to said control winding to set said selected magnetic core to a second stable state; said pulse from said multivibrator blocked by said selected magnetic core when said core is in its second stable state.

20. A memory unit comprising: a plurality of groups of multi-aperture magnetic cores each core in each group adapted to be set to two stable states and each including a first and a second aperture, a control winding extending through said first aperture, an energize winding and a sense winding each extending through said second aperture; a pulse source comprising a free running multivibrator; a plurality of load circuits each associated with one of said groups of cores; a first and a second battery source; control means comprising a plurality of first keys connected to said first battery source, a second key connected to said second battery source and a relay connected to said second key; selecting means comprising an electromechanical stepping switch; a manual advance key connected to said stepping switch, manually operated to manually advance said stepping switch to select in sequence one of each of said plurality of cores in each of said groups; an automatic advance key connected to said stepping switch manually operated to automatically advance said stepping switch to select in sequence one of each of said plurality of cores in each of said groups; said stepping switch operated in response to advancement to connect said multivibrator to said energize windings, said load circuits to said sense windings and said control circuits to said control windings, on each of said selected magnetic cores; said first keys each manually operated to connect said first battery source to said control winding on said selected magnetic cores in each of said associated groups, to a first stable state; said load circuits operated in response to pulses from said multivibrator coupled through said selected magnetic cores when said cores are in their first stable state; said second key manually operated to operate said relay to disconnect said first battery source and connect said second battery source to said control windings to set said selected magnetic cores to a second stable state; said pulses from said multivibrator blocked by said selected magnetic cores when said cores are in their second stable state.

References Cited by the Examiner

UNITED STATES PATENTS

| | | | |
|---|---|---|---|
| 3,059,224 | 10/62 | Post | 340—174 |
| 3,077,584 | 2/63 | Eschenfelder | 340—174 |

IRVING L. SRAGOW, *Primary Examiner.*